Figure 9:
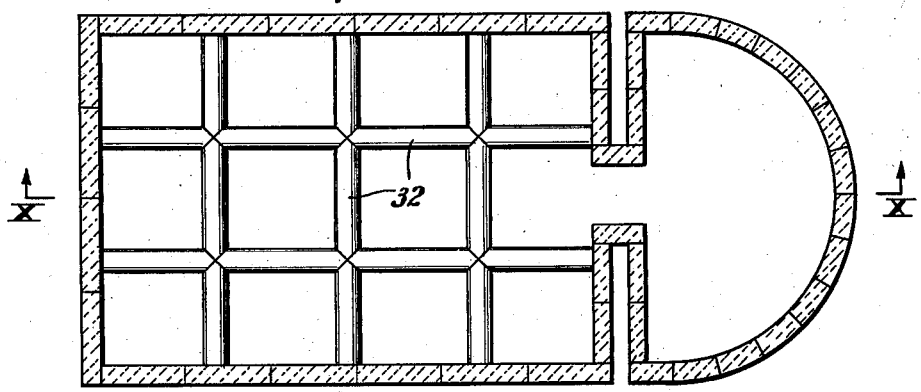

June 7, 1938. H. H. BLAU ET AL 2,119,948
TANK STRUCTURE AND METHOD FOR MAKING GLASS OR THE LIKE
Filed June 8, 1936 4 Sheets-Sheet 1
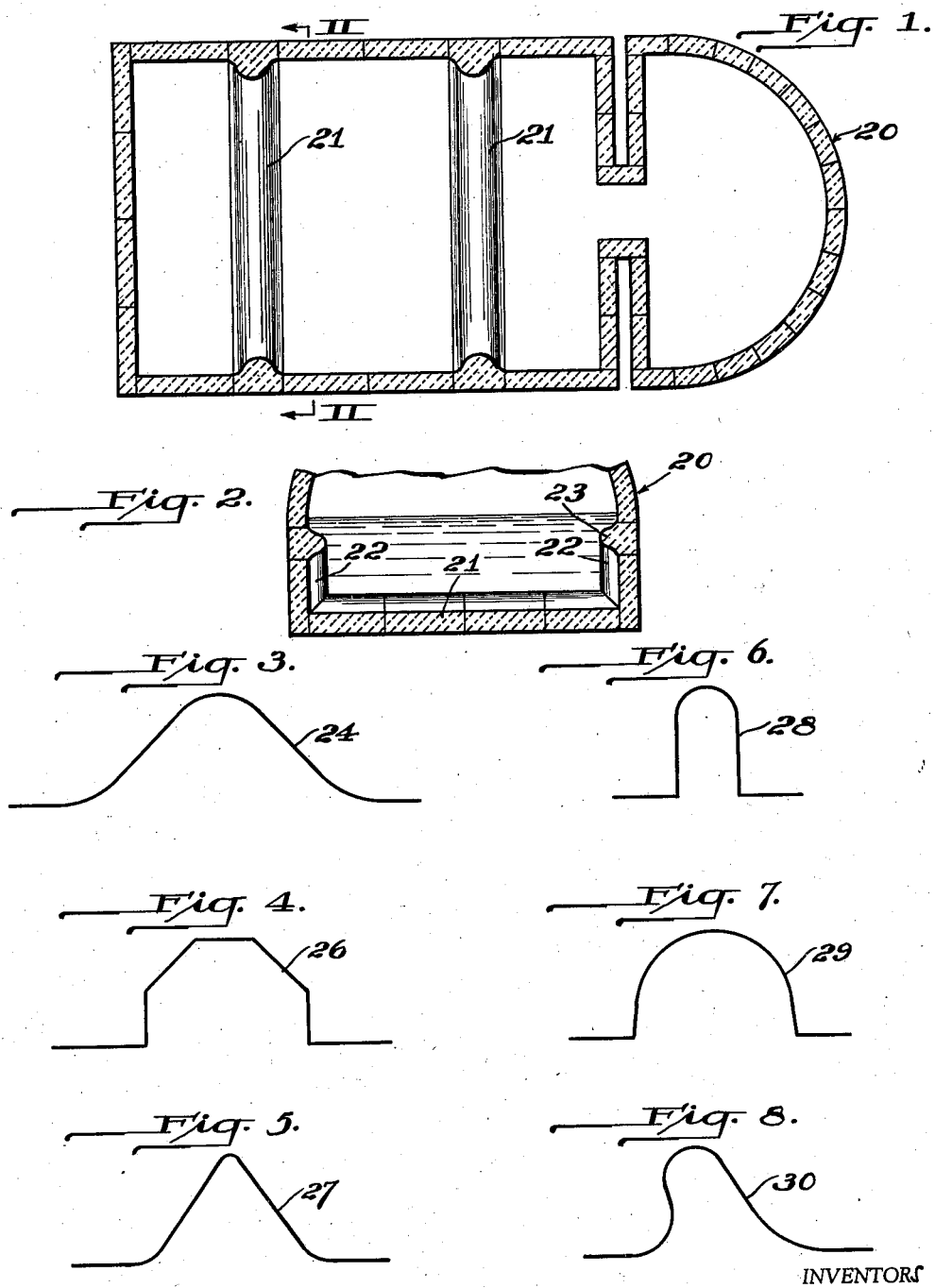
WITNESSES
INVENTORS
Henry H. Blau
Kenneth K. Knaell
BY Brown, Critchlor & Flick
ATTORNEYS June 7, 1938.  H. H. BLAU ET AL  2,119,948
TANK STRUCTURE AND METHOD FOR MAKING GLASS OR THE LIKE
Filed June 8, 1936  4 Sheets-Sheet 2

WITNESSES
A. B. Wallace
E. O. Johns

INVENTORS
Henry H. Blau
Kenneth K. Knaell
BY Brown, Critchlow Flick
ATTORNEYS.

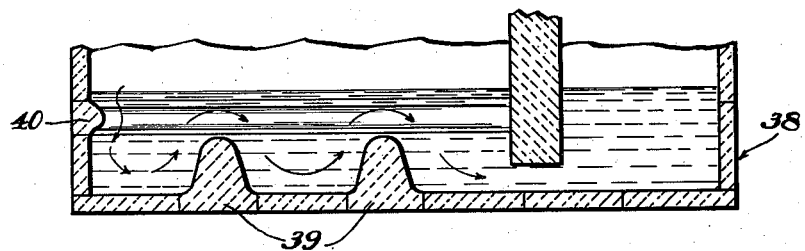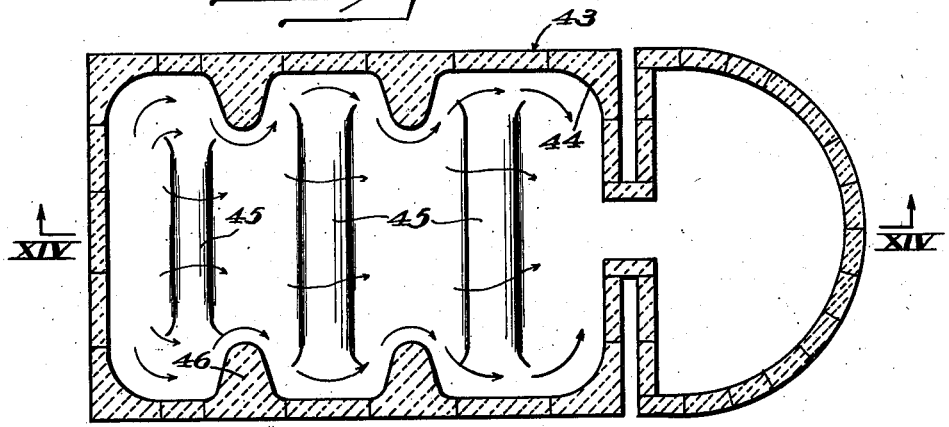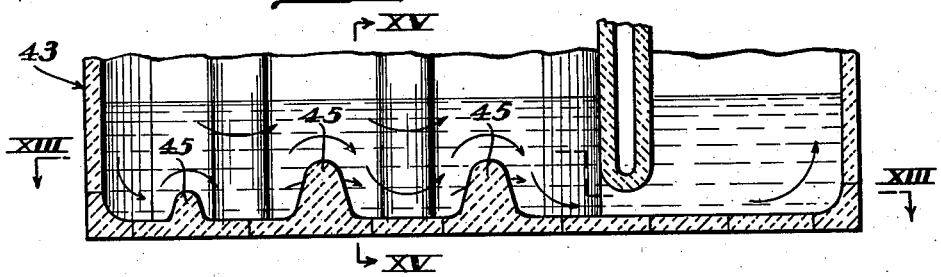

June 7, 1938.   H. H. BLAU ET AL   2,119,948
TANK STRUCTURE AND METHOD FOR MAKING GLASS OR THE LIKE
Filed June 8, 1936   4 Sheets-Sheet 4
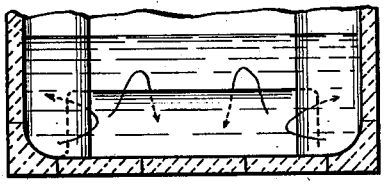
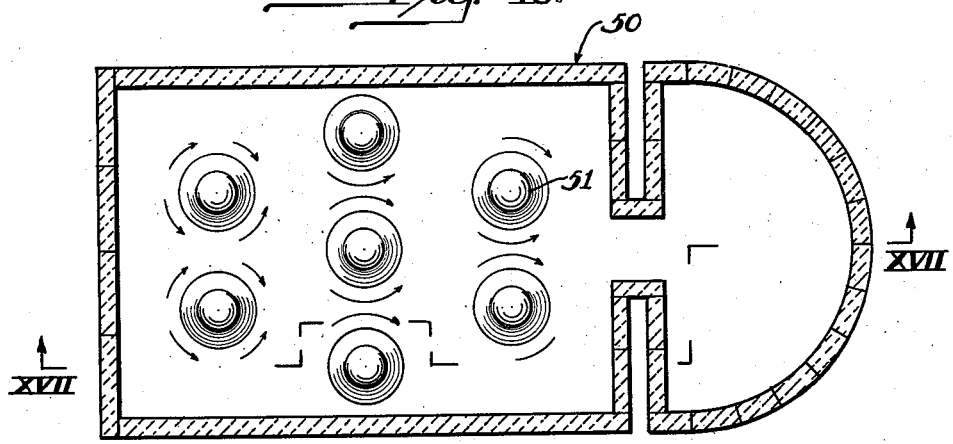
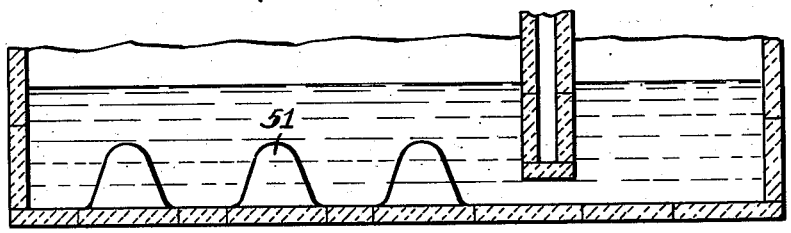
WITNESSES
A. B. Wallace.
E. O. Johns
INVENTORS
Henry H. Blau
Kenneth K. Knaell
BY Brown, Critchlow & Flick
ATTORNEYS.

Patented June 7, 1938

2,119,948

UNITED STATES PATENT OFFICE 2,119,948

TANK STRUCTURE AND METHOD FOR MAKING GLASS OR THE LIKE

Henry H. Blau and Kenneth K. Knaell, Charleroi, Pa., assignors, by mesne assignments, to Corning Glass Works, Corning, N. Y., a corporation of New York Application June 8, 1936, Serial No. 84,027

18 Claims. (Cl. 49—54)

This invention relates to tanks and conditioning chambers and methods for making glass, and more particularly is concerned with means for and methods of mechanically controlling and directing hydraulic and convectional flow of glass in tanks.

In the production of glass in tanks it is desirable to avoid pocketing of the glass in the corners and bottom of the tank which results in the pocketed glass staying in the tank for a relatively long time and which reduces the quantity and quality of the glass produced. It is also advantageous to effect a uniform melting and mixing of the entire volume of glass in the tank and to avoid corrosive action resulting from uncontrolled convectional and hydraulic flow of glass which tends to wear out the side, end or bottom walls of the tank and to reduce the effective life thereof.

Prior to our invention attempts have been made to direct and control the mixing and melting of glass in tanks by the use of mechanical means, such as baffles. It has been suggested to employ baffles in the bottoms of tanks to form quiescent pools of glass which reduce corrosive wear on the bottoms. However, the formation of quiescent pools of glass reduces the quantity of glass passing through the furnace, and certain portions of the glass stay in the tank over long periods which is undesirable.

It has also been suggested to employ baffles extending upwardly from the bottom of a tank and spaced transversely of it with other transversely arranged baffles depending into the glass through its upper surface, so that during its flow the glass will be required to take an up and down movement in the tank. These baffles, and all others in the art with which we are familiar, have square corners and serve more as barriers, dams or bridges than as mechanical means for actually directing glass flow.

This invention contemplates the use of effective mechanical means to control and direct convectional and hydraulic flow of glass with the mechanical means being particularly positioned and formed to reduce or eliminate corrosive action on the walls of the tank and on the mechanical means themselves. Corrosion is particularly active near the metal line of a tank and is normally so severe that the life of the tank is materially reduced.

Heretofore convectional and hydraulic flow of some glasses has also severely attacked the bottom wall of the tank, and, together with the corrosive action of the glass on the side wall, has caused stones, stria and the like to be dropped into, formed in and carried by the glass in the tank, which impurities and defects often pass through the throat to the refining end of the tank from which the glass is withdrawn for fabrication.

Attempts have been made to control horizontal flow of glass by baffles, but without success for the reasons discussed above in considering baffles intended for vertically directing glass flow. The baffle structures were sharp-cornered so that turbulent and eddying flow resulted, the baffles acting more as dams than as flow-controlling instrumentalities. According to this invention provision is made to completely control and direct convectional and hydraulic glass flow in tanks by use of mechanical means positioned to effect both vertical and horizontally directed glass flow to thereby increase the quantity and improve the quality of glass produced in a tank.

It is an object of our invention to avoid and overcome the aforementioned and other difficulties, objections and failures attending prior attempts to control and direct hydraulic and convectional glass flow by the provision of improved means for effectively directing and improving the mixing and melting of glass and for increasing the quantity and improving the quality of glass produced.

Another object of our invention is to provide an improved method of melting glass.

Another object of our invention is the provision of means and methods for directing and controlling convectional and hydraulic glass flow to reduce and eliminate the corrosive action of the glass on the walls of the tank.

Another object of our invention is to provide an improved tank structure combining cast refractory material and ordinary bonded refractory material whereby a materially improved tank is produced without greatly increasing the expense thereof.

Another object of the invention is the provision of mechanical means for directing and controlling glass flow in tanks with the means operating to direct the flow and thereby improve the character and increase the amount of the glass produced.

The stated objects of the invention are realized by employing mechanical baffle means in the proper positions and of determined size and contours to fully and completely direct and control convectional flow of glass in tanks, to reduce the corrosive action and to improve the quality and increase the quantity of glass produced.

In the practice of our invention a typical application of its principles comprises providing a glass tank bottom with longitudinally spaced, transversely extending baffles which only partially span the bottom, and with longitudinally spaced vertically extending baffles on the side walls of the tank positioned between the transverse baffles and extending inwardly of the tank to points between the transverse baffles. In this manner baffles are provided for both vertically and horizontally directing and mixing the glass constituents during the normal convectional and hydraulic flow of the glass in the tank. The invention contemplates making the baffles of cast refractory and making the remainder of the tank of ordinary bonded refractory. This materially improves the resistance of the tank to corrosive action from the glass flow, particularly inasmuch as the baffles are positioned to direct and divert the corrosive flow away from the walls of the tank.

One manner of practicing the method of the invention is to improve the mixing and melting of the glass by mechanically directing its flow in the tank away from the walls of the tank in horizontal or vertical directions, or a combination of the two, in non-turbulent curved paths, the glass flow thereafter being directed in both vertical and horizontal directions in other curved non-turbulent paths.

Figure 10:
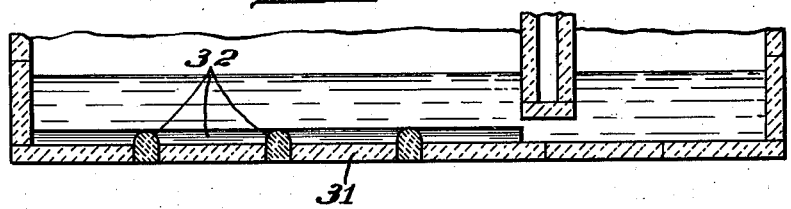
Figure 11:
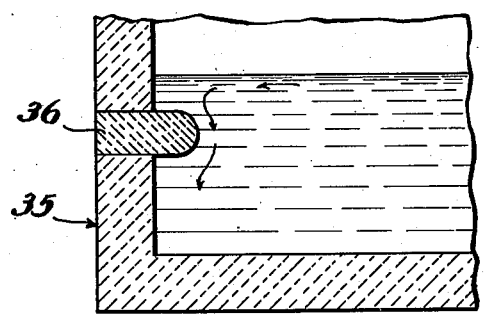

Referring to the drawings wherein several modifications of structure and diagrammatic illustrations of the method of the invention are illustrated, Fig. 1 is a horizontal sectional view of a glass tank incorporating features of the invention; Fig. 2 is a transverse sectional view taken on the line II—II of Fig. 1 and showing further details of the tank construction; Figs. 3 to 8 illustrate diagrammatically several baffle contours adapted to effect flow of various types; Fig. 9 is a plan view of a modified tank construction wherein both transversely and longitudinally extending baffles are employed in the tank bottom; Fig. 10 is a longitudinal vertical sectional view taken on the line X—X of Fig. 9; Fig. 11 is a cross-sectional view through a tank illustrating the use of horizontally positioned baffles in the side and end walls of the tank just below the metal line; Fig. 12 is a diagrammatic longitudinal vertical sectional view through a glass tank illustrating one manner of controlling and directing glass flow in the tank; Fig. 13 is a longitudinal horizontal sectional view of a tank illustrating a modified manner of directing hydraulic and convectional glass flow in the tank, the plane of view being taken on line XIII—XIII, Fig. 14; Fig. 14 is a longitudinal vertical section taken on the line XIV—XIV of Fig. 13; Fig. 15 is a transverse vertical sectional view taken on the line XV—XV of Fig. 14; Fig. 16 is a horizontal longitudinal sectional view through a tank structure illustrating another modification of controlling glass flow and means for effecting this flow; and Fig. 17 is a longitudinal vertical sectional view taken on lines XVII—XVII of Fig. 16.

While the principles of the invention can be applied to substantially any type of glass-melting tank structure with advantageous results, they are particularly applicable to the standard continuous type such as that indicated generally by the numeral 20 in Figs. 1 and 2 of the drawings. Associated with the tank 20 are transversely extending baffles 21 formed on the bottom of the tank with vertical baffles 22 being employed on its side walls and with horizontally positioned baffles 23 being incorporated in the side and end walls of the tank just below the metal line of the glass. The baffles are positioned for controlling convectional and hydraulic flow of glass in the tank and are preferably made of cast refractory. The baffles are usually of streamline contour as indicated at 24 in Fig. 3 so that the flow of glass over them results in a directing and controlling of the glass. Another advantage of the streamline baffle is that a minimum of corrosive action results from the glass flow against the baffle and associated tank structure. It will thus be recognized that the streamlined baffle offers the least resistance to the flow of glass, thereby eliminating damming of it while insuring its directed flow.

Although the invention particularly contemplates using substantially streamline baffles having a contour of the type generally shown at 24 in Fig. 3, advantages of the invention may be attained by baffles of other shapes. For example at 26 in Fig. 4 there is shown a baffle of a semi-octagonal cross-sectional contour. This form of baffle provides considerable room in the inside for temperature control, as described in our co-pending application Serial No. 84,028, filed June 8, 1936. The baffle contour shown at 27 in Fig. 5 approximates a triangle, and results in a relatively sharp directing of the glass flow. At 28 in Fig. 6 is illustrated a flat high baffle contour which functions more as a dam than to direct and control flow. Fig. 7 shows at 29 a semi-circular baffle contour which retains certain of the advantages of a streamline baffle. The numeral 30 indicates in Fig. 8 a baffle having a concave surface on one and a convex surface on its other side. This contour may be particularly advantageous in directing a return flow of glass in the tank by its overhanging top, the baffle serving to permit flow in one direction and prevent it in the other.

One feature of the invention is the provision of a tank having its main portion formed of ordinary bonded refractory which is relatively inexpensive, with spaced baffles formed of cast refractory having very high resistance to corrosion. This combination of refractory material in a tank materially improves its structure and greatly increases its life because the cast refractory serves as a grill or skeleton strengthening and increasing the life of the bonded refractory without materially increasing the cost of the tank. While various cast refractories, such as mullite, may be used for forming the baffles, it is preferred to use fused cast refractories containing not less than about 80% alumina the remainder being chiefly silica. Another suitable cast refractory is beta alumina formed by fusing alumina and about 5% of sodium oxide, the material being cast to form desired shapes. These high alumina cast refractories are very resistant to corrosion.

In Figs. 9 and 10 is illustrated a tank structure having its bottom provided with both longitudinal and transversely extending baffles 32 which are made of cast refractory and which serve as a strengthening grill or skeleton in the ordinary bonded refractory of which the remainder of the tank is made. While the strengthening cast refractory baffles 32 may be made flush with the surface of the bottom wall of the tank, they are preferably extended somewhat above the bottom of the tank as best seen in Fig. 10.

In the use of the tank shown in Figs. 9 and 10 the cast refractory baffles 32 function as dams of corrosion-resisting material and serve to prevent cutting out of the ordinary bonded refractory bottom by hydraulic and convectional glass currents. Any heavy refractory pieces that break loose from the tank bottom or from the side walls of the tank are trapped in the pockets formed by the baffles 32 which serve as dams to prevent all such material from being carried through the throat to the refining end of the tank. While the use of the skeleton grill of cast refractory baffles 32 has been particularly described as being used in the bottom wall of the tank, it should be understood that the invention contemplates using similar strengthening baffles in the side or end walls of the tank. Likewise, the baffles 32 may be formed to direct glass flow as heretofore or hereinafter described rather than to function solely as dams, and if flow direction is desired the baffles are made of contours above described.

Fig. 11 illustrates a baffle structure generally described in conjunction with Figs. 1 and 2. The glass tank there indicated generally by the numeral 35 is usually made of ordinary bonded refractory and is provided with a baffle 36, preferably of cast refractory, positioned horizontally in the tank side wall just below the metal. This baffle controls convectional and hydraulic flow of glass in the manner and direction shown by the arrows. Thus the normal glass flow towards the relatively cold walls of the tank is diverted or directed away from the wall towards the center of the tank to materially reduce the corrosive action normally attending flow of glass against the side walls at and adjacent to the metal line.

Fig. 12 illustrates a tank 38 of conventional form provided with relatively high transversely extending baffles 39 which are advantageously of streamline contour and of cast refractory. Baffles 40 are also provided on the side and rear walls of the tank in horizontal positions just below the metal line of the glass in the tank, and are also advantageously made of cast refractory and of streamline contour. The resulting flow of glass in the tank from both hydraulic and convectional causes is illustrated by arrows which show the absence of corrosive currents adjacent the metal line and indicate the relatively high vertical, non-turbulent, non-eddying flow of glass through the tank without damming, whereby an improved mixing and melting of the glass is obtained.

In the embodiment of the invention illustrated in Figs. 13, 14 and 15 there is shown a glass tank 43 which is ordinarily made of bonded refractory and is provided with filleted or rounded corners 44. Thus all square, sharp corners and angles are eliminated in the tank with a corresponding reduction in dead pockets of quiescent glass and a resulting improvement in the control and direction of the flow of glass in the tank. The quantity of glass produced in any given tank in a given time is increased and its quality improved.

Positioned in the bottom of the tank are transversely extending baffles 45 which are preferably made in stepped sizes, as best seen in Figs. 13 and 14, and which terminate short of the sides of the tank. The baffles 45 are preferably formed streamline in contour for the reasons heretofore stated and are advantageously made of cast refractory. On the side walls of the tank there are vertical baffles 46 which lie between the horizontal baffles 45 so that the convectional and hydraulic flow of glass through the tank takes paths such as shown by the arrows. Portions of the glass flow up and over the baffles 45 and other portions flow around their ends and strike the vertically extending baffles 46 which direct the flow back between the horizontal baffles 45. The resulting combined horizontal and vertical flow effects a uniform mixing and melting of the glass prior to flow through the throat to the refining end of the tank. Quiescent pools or pockets of glass in the tank are largely avoided and the quality of the glass is materially improved. A particular part of the inventive concept is to construct the baffles of cast refractory while the remainder of the tank is of ordinary bonded refractory.

It is not necessary that the mechanical means utilized for directing glass flow be in the form of ribs or barriers which extend transversely or longitudinally of the tank for some distances. For example, the baffles may take the form of relatively short substantially symmetrical projections preferably made of cast refractory, which interrupt flow, the projections being positioned in longitudinally and transversely spaced areas. In Fig. 16 a tank 50 of conventional construction is provided with a plurality of hemispherical beehive-like baffles 51 which serve to control or direct the flow of glass in the manner indicated by the arrows. This flow results in a mixing of the body of glass in the tank and improves its quality and increases the quantity of the glass produced. As heretofore stated, the baffles 51 may be made of cast refractory, and they are preferably formed to effect a non-turbulent flow of glass.

From the foregoing it will be recognized that in the practice of some features of our invention improved mechanical means prevent quiescent trapped pools of viscous glass with an attending mixing and more uniform melting of the entire batch of glass in the tank. This materially improves the character and increases the amount of glass produced by any given tank per unit of time. The mechanical means for controlling glass flow are formed to direct the flow, and the baffle means moreover function to reduce corrosive action of the glass on the tank walls. The mechanical baffle means controlling flow are in some cases so incorporated with the tank structure as to serve as strengthening grills or skeletons of cast refractory, whereby the life of the tank is considerably prolonged without materially increasing its cost.

In the practice of the invention a tank of a given size can be constructed and operated with distinct increase in production over that of a similarly sized tank of former constructions. Also a smaller tank made and used in accordance with the principles herein disclosed effects the same production as a larger prior art tank or a prior art tank using a greater amount of fuel for melting the glass.

While in accordance with the patent statutes several embodiments of the invention and several manners of practicing it have been illustrated and described, it should be appreciated that the invention is not limited thereto or thereby but is defined in the appended claims.

We claim:

1. In a glass-melting tank, spaced transversely extending baffles of refractory material only partially spanning the tank bottom, and spaced vertically extending baffles of refractory material on the side walls of the tank positioned between the transverse baffles and projecting outwardly to points between the transverse baffles.

2. A glass-melting tank having a bottom and side and end walls of refractory, refractory fillets curved on large diameters and rounding and filling the corners between the walls whereby trapped pockets of glass are reduced in the tank, and baffles formed of refractory positioned in the tank for controlling and directing convectional and hydrostatic flow.

3. A glass-melting tank having a glass-engaging surface of bonded refractory interspaced with longitudinally and transversely extending ribs of cast refractory, said ribs extending outwardly from the surface of the bonded refractory and serving as dams to prevent the bonded refractory bottom from wearing and cutting out and to trap deleterious material against flow with the glass.

4. A glass-melting tank having side and bottom walls and a horizontally extending baffle of cast refractory projecting from the side wall of the tank and positioned slightly below the metal line to break up and outwardly direct convectional glass flow and thereby reduce corrosive action at the metal line.

5. A glass-melting tank having its bottom provided with a plurality of substantially hemispherical baffles of refractory material for directing and controlling glass flow.

6. A glass-melting tank including baffles projecting from its side and bottom walls and formed of refractory, certain of said baffles having a streamlined contour in cross-section to direct and control the flow of glass with a minimum of eddy currents and corrosive action.

7. A glass-melting tank having a wall provided with a baffle formed of refractory, said baffle having a concave surface on one and a convex surface on its other side to restrict flow in one and to facilitate it in the other direction.

8. A glass-melting tank having a bonded refractory bottom provided with spaced cast refractory dams forming a grill extending through the bonded refractory bottom and reducing corrosive action on it.

9. A glass-melting tank having a bottom formed of bonded refractory interspaced with longitudinally and transversely extending ribs of cast refractory, said ribs serving as dams to reduce corrosive action on the bonded refractory bottom and to trap deleterious material against flow with the glass.

10. In a glass-melting tank provided with refractory baffles positioned to mechanically control and direct the flow of glass in the tank, certain of said baffles being on the bottom wall of the tank and others being on its side walls, those baffles on the side walls of the tank being positioned between those on the bottom wall to effect a controlled and directed mixing and flow of the glass in the tank.

11. A glass-melting tank including side, end and bottom walls, a horizontally disposed cast refractory baffle projecting from the rear end wall of the tank and positioned just below the metal line, a plurality of relatively high transversely extending cast refractory baffles of streamline contour on the bottom of the tank and serving to direct the glass upwardly at spaced increments of its flow through the tank.

12. A glass-melting tank including side, end and bottom walls, a plurality of transversely extending cast refractory baffles of substantially streamline contour on the bottom wall of the tank and serving to direct the glass upwardly at spaced increments of its flow through the tank.

13. In a glass-melting tank having end, side and bottom walls of ordinary bonded refractory and a plurality of transverse lines of cast refractory baffles, each line comprising a plurality of baffles positioned and formed to direct convectional and hydraulic flow of glass in the tank.

14. In combination with a glass tank, a plurality of cast refractory baffles having curved outer surfaces to eliminate damming, eddy currents and corrosive action.

15. A glass-melting tank including side, end and bottom walls, longitudinally spaced cast refractory means associated with the bottom tank wall for mechanically directing the glass upwardly in the tank during its hydraulic and convectional flow in it, and cast refractory means positioned between the longitudinally spaced means for mechanically directing the flow of glass in the tank in a horizontal direction.

16. A glass-melting tank including side, end and bottom walls made of ordinary bonded refractory, and dams of cast refractory interspaced in the walls.

17. The method of mixing molten glass during its flow in a continuous melting tank, comprising causing the entire portion of glass adjacent to a glass-contacting surface of the tank to move bodily towards the center of the tank in streamline flow.

18. The method of mixing molten glass during its flow in a continuous melting tank, comprising causing the portions of the glass adjacent to the sides of the tank to move bodily towards the center of the tank at a plurality of spaced places, and causing the portions of the glass at the bottom of the tank to move upwardly between said spaced places.

HENRY I. BLAU.
KENNETH K. KNAELL.